(12) United States Patent
Spaeth et al.

(10) Patent No.: US 7,805,962 B2
(45) Date of Patent: Oct. 5, 2010

(54) DEVICE AND METHOD FOR THERMALLY PRE-STRESSING ELONGATED HOLLOW OBJECTS

(75) Inventors: Michael Spaeth, Frankenthal (DE); Klaus Krippeit, Alzey (DE); Hendrik Alfter, Mainz (DE); Juergen Thuerk, Muellheim (DE)

(73) Assignee: Schott AG, Mainz (DE)

( * ) Notice: Subject to any disclaimer, the term of this patent is extended or adjusted under 35 U.S.C. 154(b) by 981 days.

(21) Appl. No.: 11/186,108

(22) Filed: Jul. 21, 2005

(65) Prior Publication Data

US 2006/0016220 A1   Jan. 26, 2006

(30) Foreign Application Priority Data

Jul. 26, 2004   (DE) ..................... 10 2004 037 491

(51) Int. Cl.
*C03B 27/00* (2006.01)
(52) U.S. Cl. .......................................... 65/114; 65/115
(58) Field of Classification Search ........................ None
See application file for complete search history.

(56) References Cited

U.S. PATENT DOCUMENTS 2,375,944 A * 5/1945 Quentin ....................... 65/115
4,773,926 A * 9/1988 Letemps et al. ............... 65/114

FOREIGN PATENT DOCUMENTS

| DE | 645 699 | 6/1937 |
| FR | 800.531 | 7/1936 |
| GB | 512976 | 9/1939 |

* cited by examiner

*Primary Examiner*—Philip C Tucker
*Assistant Examiner*—Michael J Felton
(74) *Attorney, Agent, or Firm*—Harness, Dickey & Pierce, P.L.C.

(57) ABSTRACT

A device and a method for thermal pre-stressing lengthy hollow objects, in particular glass tubes, are disclosed. The device comprises a heating device, a fixture for receiving an object, and a coolant feed device comprising an outer coolant feed unit with a plurality of nozzles for feeding coolant against an outer surface of the object, and further comprising an inner coolant feed device for feeding coolant against an inner surface of the object.

17 Claims, 1 Drawing Sheet

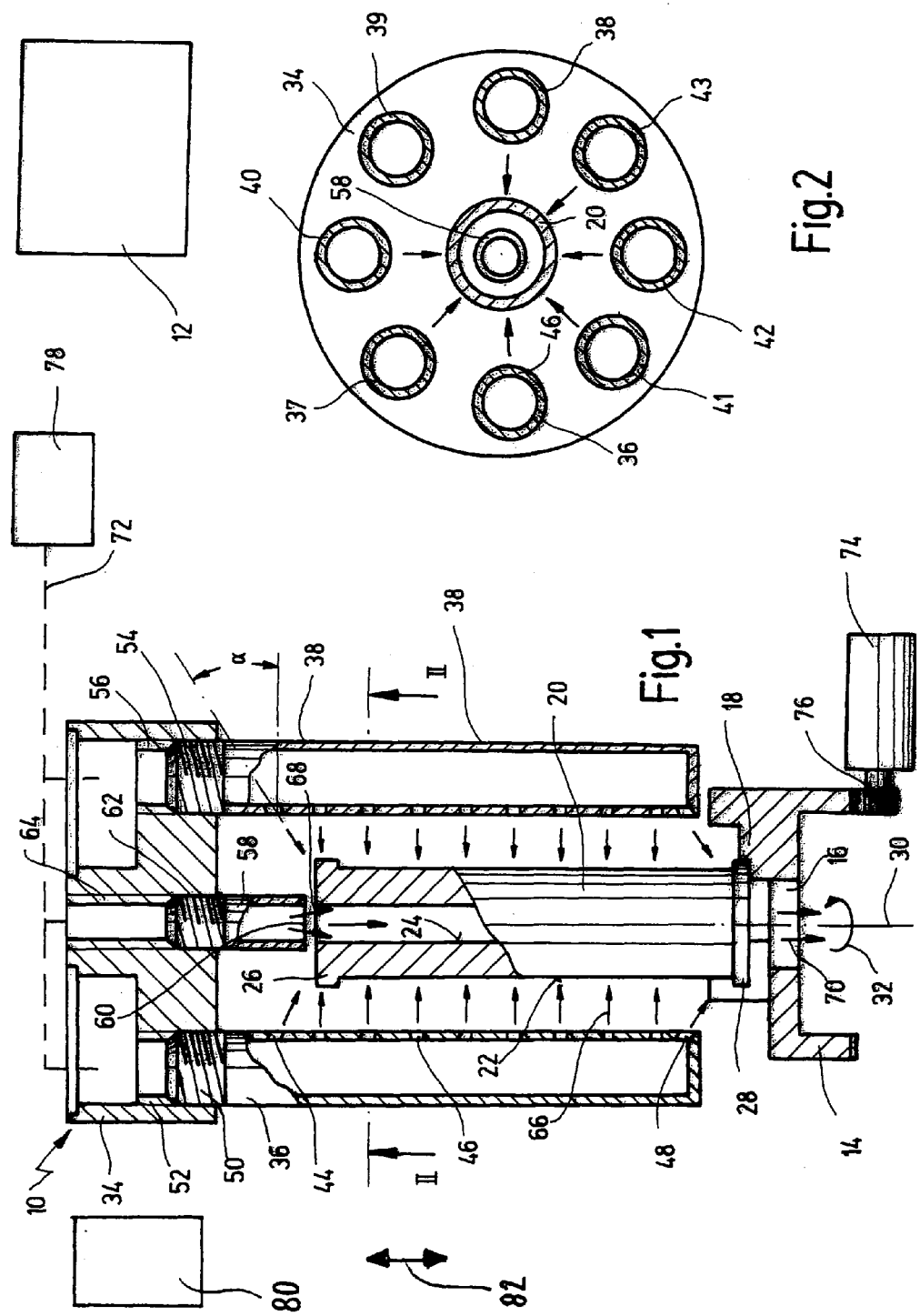

DEVICE AND METHOD FOR THERMALLY PRE-STRESSING ELONGATED HOLLOW OBJECTS

BACKGROUND OF THE INVENTION

The present invention relates to a device and a method for thermally pre-stressing elongated objects made from glass, especially for pre-stressing glass tubes, ampoules, syringes, phials or carpules.

For increasing the strength of glass, two methods have been known. One of them is known as chemical pre-stressing, the other one as thermal pre-stressing.

In chemical pre-stressing of glass, pressure pre-stressing is achieved at the glass surface by varying the composition of the glass surface, compared with the interior of the glass. This is effected as a rule by an ion exchange process. Chemical pre-stressing of glass actually results in a relatively high increase of strength, but is very time-consuming.

In thermal pre-stressing of glass, used especially for flat glass or curved glass, the finished cut plates are conveyed into a device, in suspended or flat condition, where their surface is heated up quickly to a temperature of approximately 150 degrees above transformation temperature. Immediately thereafter, cold air is blown against the glass by a nozzle system adapted to the glass shape. As a result of the quick cooling-down process, the glass surface is frozen in an expanded-grating condition, while the interior of the glass has time to cool down slowly and to contract more effectively. Given the fact that the surface and the interior of the glass form a single unit, the result is a pressure pre-stress in the surface layer and a tension pre-stress in the interior of the glass.

In thermal pre-stressing different cooling agents can be used, such as air, oil or water. It is understood that liquids such as oil or water permit clearly higher cooling-down speeds and, thus, higher increases in strength, than to be reached with air, for example. Further, it is known that large glass elements of considerable thickness can be thermally pre-stressed relatively easily as the great thickness provides the possibility to realize temperature differences between the interior and the surface with the aim to achieve differences in stress. On the other hand, glass objects having a small thickness and a relative low coefficient of thermal expansion normally can be pre-stressed using gaseous agents only with difficulty as due to the small thickness sufficiently high temperature differences can be reached only with difficulty and only small stresses can be achieved by cooling as a result of the small coefficients of thermal expansion. As a rule, one therefore uses oil for thin objects because this permits clearly higher temperature differences to be achieved. In many cases, however, the use of oil is undesirable because oil leads to contaminations so that in the pharmaceutical industry, for example, the use of oil is excluded.

DE 645 699 describes a device and a method for thermally pre-stressing glass tubes, wherein the glass tube to be pre-stressed is suspended in vertical position and is fully enclosed by a jacket through which cooling air is blown against the outer surface of the tube from a plurality of nozzles, the cooling air being then exhausted through openings immediately neighboring such nozzles.

Although the prior device and the prior method are suited for thermally hardening glass tubes of bigger diameters and greater thickness, they are not suited for thermally pre-stressing glass tubes having smaller diameters, for example in the order of up to 20 mm, and smaller wall thicknesses, for example in the range from 1 to 5 mm.

FR 800 531 further describes a device and a method for thermally pre-stressing large glass objects, wherein relative rotation can be produced between the glass object and the blowing device.

GB 512,976 discloses a device and a method for thermally pre-stressing large glass tubes, wherein relative rotation can be produced between the glass object and the blowing device. Cooling air is blown into an axial end of the object. Also cooling air is blown out of a plurality of nozzles arranged at equal spacings from each other along a tube that extends parallel to the glass tube to be treated.

These publications, however, do not teach how very small glass objects can be thermally pre-stressed. Since small objects tend to have a small heat capacity, it is very difficult to thermally pre-stress such objects, which cool very rapidly thereby counteracting the thermal pre-stressing operation.

SUMMARY OF THE INVENTION

It is a first object of the invention to provide a device and a method for thermally pre-stressing relatively small elongated hollow objects made from glass, using gas as a cooling agent.

It is a second object of the invention to provide a device and a method for thermally pre-stressing small glass tubes, ampoules, syringes, phials or carpules, by which glass tubes of small diameter and small wall thicknesses.

These and other objects are achieved by a device for thermally pre-stressing elongated hollow objects made from glass, especially for thermally pre-stressing glass tubes, ampoules, syringes, phials or carpules, having a cooling agent supply comprising an outer cooling-agent guide for directing a flow of cooling agent against the outer surface of the object, and comprising an inner cooling-agent guide for directing cooling agent against the inner surface of the object.

The object of the invention is further achieved by a method for thermally pre-stressing oblong hollow objects, especially of glass tubes, wherein an object is heated up to a temperature above glass transformation temperature and a cooling agent is blown against the object, the cooling agent being simultaneously blown against the outer surface and against the inner surface of the object.

It has been found that a clearly improved pre-stressing effect is achieved if instead of blowing the cooling agent against the outer surface only, it is blown simultaneously against the inner surface.

According to the invention the outer cooling-agent supply comprises a plurality of nozzles, provided substantially in coaxial arrangement, for blowing a cooling agent against the outer surface.

This permits uniform surface contact and a uniform surface cooling effect to be achieved, whereby local variations in the resulting pre-stress are avoided.

According to a further development of the invention, at least part of the nozzles are directed against the object at a right angle, and according to a further embodiment of the invention at least part of the nozzles are directed against the object obliquely, at least in the area of the axial ends.

It is thus possible to achieve an optimally uniform flow of the agent against the oblong objects from the outside, the oblique arrangement of the nozzles further permitting, for example in areas of greater thickness such as at the axial ends, to achieve an improved cooling effect through the arrangement of additional nozzles.

According to a further advantageous development of the invention, a rotary drive is provided for rotation of the holder and/or the nozzles.

This permits very uniform pre-stresses to be achieved so that all in all a high increase in strength and little probability of failure can be achieved.

The rotary drive may be configured to produce a rotary movement with at least 30, preferably at least 50, more preferably with at least 90 revolutions per minute.

This further supports the aim of achieving an especially uniform pre-stress.

According to a further configuration of the invention, the nozzles have a hole diameter D, and are arranged at a distance A from the outer surface of the object which is smaller than six times the hole diameter: A<6×D.

Preferably, the nozzles are spaced from neighboring nozzles by 3 to 10 mm, preferably approximately 4 to 6 mm.

Further, the nozzles preferably are arranged at uniform spacings.

This feature permits local variations of the resulting pre-stress to be further reduced.

According to an additional further development of the invention, the nozzles are formed on supply channels that extend in parallel to the longitudinal axis of the object and between which free spaces are formed.

The supply channels may be designed as tubes extending in parallel to the longitudinal axis of the object at uniform angular spacings one from the other.

This feature on the one hand provides for uniform flow against the outer surface and, on the other hand, permits rapid exhausting of the air.

The nozzles may be formed in each case as a succession of bores in a tube.

This feature allows an especially uniform flow against the outer surface.

According to a further embodiment of the invention, the inner cooling-agent guide intended to direct the flow against the object is formed at a first axial end.

According to an additional further development of that embodiment, a discharge opening for the discharge of cooling agent is provided at the second axial end of the object.

It is possible in this way to achieve an axial air flow along the inner surface of the object, which has been found to be of special advantages for the purpose of achieving uniform thermal pre-stressing.

The inner cooling-agent guide may be provided for this purpose with a tube with an end face through which cooling agent can be supplied into the object.

According to an advantageous further development of that embodiment, the tube ends in the vicinity of the first glass tube.

These features contribute toward improving the thermal pre-stress achievable.

As a rule, air will be sufficient as cooling agent. In addition, other gaseous agents, such as nitrogen, helium, etc., are of course likewise possible if that is of advantage in special particular applications. In addition, the use of water mist or mixtures with gases is likewise of advantage as improved heat transfer may be achieved in this way.

Even higher pre-stress values can be achieved if the cooling gas is cooled before being applied.

This is of advantage when especially thin objects are to be thermally pre-stressed, or if the glass materials used have very high glass transformation temperatures.

As has been mentioned before, the device and the method according to the invention can be used with advantage for thermally treating oblong hollow objects, such as glass tubes, having an inner diameter of 1 to 100 mm, preferably 2 to 20 mm, more preferably 3 to 5 mm. The wall thickness may vary in this case between 0.5 and 10 mm, especially between 0.5 and 5 mm, for example.

Further, it is possible to pre-stress glass objects having a length of 5 to 300 mm, preferably 10 to 150 mm, for example, which have a coefficient of thermal expansion of $<1.5 \cdot 10^6$/K or even $<0.9 \cdot 10^6$/K.

Preferably, the objects to be pre-stressed are first heated up, in a furnace or the like, to a temperature sufficiently above the glass transformation temperature (for example 150 K above Tg), and are then thermally pre-stressed outside the furnace using the device according to the invention.

It is understood that the features of the invention mentioned above and those yet to be explained below can be used not only in the respective combinations indicated, but also in other combinations or in isolation, without leaving the scope of the present invention.

BRIEF DESCRIPTION OF THE DRAWINGS

Further features and advantages of the invention will become apparent from certain preferred embodiments of the invention which will be described hereafter with reference to the drawings in which:

FIG. 1 shows a simplified longitudinal section through a device according to the invention; and FIG. 2 shows a section along line II-II through the device of FIG. 1.

DETAILED DESCRIPTION OF THE PREFERRED EMBODIMENTS

In FIG. 1, a device according to the invention is indicated generally by reference numeral 10.

The device 10 has no heating means of its own. Rather, the objects to be thermally pre-stressed are mounted on a holder 14 and are pre-heated in preceding heating means, such as a furnace, which is shown in the drawing only diagrammatically (not to scale) and is indicated by reference numeral 12. The object, together with the holder, are then removed from the furnace, preferably in a state uniformly heated up to a temperature of approximately 150K above the transformation temperature Tg. Thereafter, the device 10 is lowered to enclose the outside of an object 20 to be pre-stressed.

The device 10 comprises a gas supply adapted to supply a cooling agent from the top. In order to enable objects 20 to be pre-stressed to be fed into and to be discharged from the device, in automatic production, it is an advantage if the entire device 10 can be moved automatically by a drive (merely schematically indicated at 80) in vertical direction (see arrow 82), while a handling device may be provided for feeding the objects to be pre-stressed, together with the holder 14, and for discharging them at the end of the thermal pre-stressing operation.

In the present case, the object to be thermally pre-stressed, for example in the form of a glass tube 20, is a cylindrical glass tube consisting of Fiolax® glass (a glass marketed by applicant) and having a first upper end 26 and a second lower end 28. The upper and lower ends 26, 28 are each provided with outwardly projecting ring lands. In the present case, the glass tube has an outer diameter of approximately 12.5 mm, a wall thickness of approximately 2 mm and a length of approximately 46 mm.

The device for the supply of cooling air comprises a cylindrical flange 34, fitted in the heating means 12 from above and is provided with a central tube 58 and eight outer tubes 36, 37, 38, 39, 40, 41, 42, 43 arranged on an imaginary circle in the vicinity of the outer edge of the flange 34 at a regular angular spacing of 45° one relative to the other (compare FIG. 2). A threaded section 62 of the central tube 58 is screwed into the thread of a passage bore 64 from below and projects downwardly from the flange 34 by a certain amount so that the end face 60 of the central tube 58 ends immediately in front of the axial end 26 of the glass tube 20. Preferably, the central tube 58 has an inner diameter substantially identical to the inner diameter of the glass tube 20 to be pre-stressed. The tubes 36-43 have a diameter somewhat larger than the central tube 58 and are likewise provided with threaded sections 50, 54 that are screwed into respective bores 52 and 56, respectively, of the flange 34. The outer tubes 36-43 are closed at their ends opposite the flange 34, but can be supplied with compressed air from the side of the flange in a manner not illustrated in detail. The outer tubes 36-43, arranged in parallel to the longitudinal axis 30 of the holder and of the glass tube, each comprise, on their side facing the glass tube 20, a series of bores 46 provided radially in the surface area. The bores act as nozzles 46 and, when a pressure agent is supplied to the tubes 36-43, cause the pressure agent to directly impinge vertically upon the outer surface 22 of the glass tube 20, as indicated in the drawing by arrows 66. In addition, each tube 36-43 is provided at its upper end and at its lower end with a bore 44 and a bore 48 which are inclined in downward direction by an angle α, in the present case an angle of approximately 30°, in order to improve the flow against the upper end 26 and the lower end 28, respectively of the glass tube 20. The bores 46 are arranged in a line, at regular spacings of approximately 6 mm in the present case.

The holder 14 is designed as a three-point holder with three holding points 18 arranged at an angular spacing of 120° one relative to the other, although a single holding point 18 can be seen only in the drawing plane of the sectional drawing of FIG. 1. The holder 14 is provided with a central passage 16 so that cooling gas supplied via the central tube 58 is axial direction, having flown through the glass tube 20, can be discharged through the passage 16 of the holder 14.

In addition, the holder 14 can be adapted for being driven about its longitudinal axis 30 by a rotary drive 74 indicated only diagrammatically. The rotary drive 74 may be coupled with a ring gear provided on the lower end of the holder 14, via a pinion 76, for example.

It is understood that the described arrangement is intended as an example only and that the rotary drive may be coupled also with the holder 14 or, if desired, with the flange 34 in any other way.

In operation, the glass tube 20 mounted on the holder 14, having first been heated up to a temperature above its glass transformation temperature Tg, in most of the cases to a temperature of approximately 150° above Tg, is subjected to a flow of cooling air from the outside, via the nozzles 44, 46, 48 provided in the outer tubes 36-43. At the same time, cooling air is fed via the central tube 58 into the upper end 26 of the glass tube 20 so that the air flows through the tube in axial direction, as indicated by arrows 68 and 70, respectively. The inner surface 24 is thereby cooled until finally the cooling gas exits at the lower end through the passage 16 of the holder 14, as indicated by arrows 70. During that process, the holder 14 on which the glass tube 20 is held by the three contact points 18 in a manner not shown in detail, is preferably set into rotation by the rotary drive 74.

The cooling air is supplied into the outer tubes 36, 37 38, 39, 40, 41, 42, 43 and into the central tube 58 via a conduit 72, which is indicated only diagrammatically in the drawing.

This can be effected at a line pressure normal for a compressed-air supply system, which usually lies between approximately 5 and 7 bar.

The following data were used in treating Fiolax® tubes of the kind described above:

Glass temperature: Tg=565° Celsius, heating time: (preheating of the glass tube in the furnace): t=240 sec., furnace temperature: T=720° Celsius, cooling time (supply of cooling gas): t=30 sec. The holder 14 was driven at approximately 60 revolutions per minute during the pre-stressing process.

Upon termination of the cooling process, by the supply of compressed-air, the glass tubes were removed together with their holder, and were permitted to cool down at room temperature in air.

With a process controlled in this way it was possible to achieve pressure stresses of up to 150 MPa in the glass tube surfaces. This gives the tubes a strength that will resist a bursting pressure of approximately 400 bar.

The increase in strength that can be achieved is comparable with the increase in strength achievable by chemical pre-stressing.

In FIG. 1, reference numeral 78 indicates an additional cooling unit by means of which the supplied air can be cooled in order to permit even higher pre-stress values to be achieved. In the illustrated embodiment, however, no such cooling means were used.

What is claimed is:

1. A device for thermally pre-stressing an elongated hollow glass tube having an elongated interior surface, comprising:
    a heater for heating the tube to be pre-stressed;
    a holder configured for holding the tube to be pre-stressed at one end thereof;
    a rotary drive for rotating said holder about a longitudinal axis;
    a support body having a fluid inlet;
    a pressure line connected to said fluid inlet for feeding a cooling agent into said fluid inlet;
    a plurality of fluid lines communicating with said fluid inlet; and
    a plurality of outlet openings communicating with said fluid lines, said outlet openings being arranged concentrically to said longitudinal axis and being configured for directing a flow of cooling agent against an outer surface of the tube held within said holder;
    wherein one of said fluid lines is a central tube having an end face which is axially aligned with a first upper axial end of said tube and terminates immediately adjacent said first upper axial end of the tube, said central tube having an inner diameter of 2 to 20 mm and substantially equal to an inner diameter of the tube to be pre-stressed and being configured for directing cooling agent in the first upper axial end and along the entire elongated interior surface of the tube held within said holder.

2. The device of claim 1, further comprising a drive for moving said holder and said support body relative to each other.

3. The device of claim 1, further comprising a plurality of studs extending from said support body in parallel to said longitudinal axis, a free space being defined between said studs into which the tube held on said holder protrudes, wherein said fluid lines extend within said studs.

4. The device of claim 3, wherein said studs are configured as tubes extending at uniform angular spacings about said longitudinal axis.

5. The device of claim 3, wherein each stud comprises a plurality of outlet openings arranged along each stud axially spaced from each other.

6. The device of claim 3, wherein at least some of said outlet openings are configured as nozzles arranged for blowing cooling-agent against an outer surface of the tube held on said holder substantially perpendicularly to an outer surface thereof.

7. The device of claim 3, wherein at least some of said outlet openings are configured as nozzles arranged for blowing cooling-agent against an outer surface of the tube held on said holder at an inclined angle relative to the outer surface.

8. The device of claim 1, wherein said rotary drive is configured to produce a rotary movement with at least 30 revolutions per minute.

9. The device of claim 5, wherein the outlet openings are arranged along each stud at spacings from each other which are between 3 and 10 millimeters.

10. The device of claim 1, which further comprises a blowing tube extending from said support body and having an outlet opening at an axial end thereof.

11. The device of claim 1, further comprising a cooler for cooling the cooling agent.

12. The device of claim 1, wherein said holder is configured for holding a tube having a wall thickness of between 1 and 5 millimeters.

13. The device of claim 1, wherein said holder and said support body are arranged at such a distance from each other so as to allow a thermal pre-stressing treatment of a tube having a length of 10 to 150 millimeters.

14. A method for thermally pre-stressing an oblong hollow glass tube having an elongated interior surface, comprising the following steps:

heating the tube, having an inner diameter of 2 to 20 ram, up to a temperature above the glass transformation temperature (Tg);

clamping said tube within a holder;

rotating said holder about a longitudinal axis;

directing a cooling agent against an outer surface of said tube from a plurality of outlet openings arranged concentrically to said longitudinal axis; and simultaneously directing the cooling agent in an axial direction into a first upper axial end of the tube and along an the entire elongated interior surface of said tube from a central fluid line having an outlet opening arranged opposite said holder and having an end face which is axially aligned with said first upper axial end of the tube and terminates immediately adjacent said first upper axial end of the tube, said central tube having an inner diameter of 2 to 20 mm and substantially equal to an inner diameter of the tube to be pre-stressed.

15. The method of claim 14, wherein the cooling agent is blown against the outer surface of said object substantially at a right angle.

16. The method of claim 14, wherein the cooling agent is substantially blown in an axial direction into an axial end of the tube.

17. The method of claim 14, wherein one of said holder and said outlet openings is driven at a speed of at least 30 revolutions per minute with respect to the other.

* * * * *